United States Patent [19]

Bakshi et al.

[11] Patent Number: 4,524,171

[45] Date of Patent: Jun. 18, 1985

[54] PREPARATION OF AN AROMATIC POLYIMIDE ACID BY SOLUTION POLYMERIZATION USING PROPYLENE GLYCOL METHYL ETHER

[75] Inventors: Kiran R. Bakshi, Murrysville; Walter P. Barie, Glenshaw; Edward T. Sabourin, Allison Park, all of Pa.

[73] Assignee: Gulf Oil Corporation, Pittsburgh, Pa.

[21] Appl. No.: 642,518

[22] Filed: Aug. 20, 1984

[51] Int. Cl.$^3$ .............................................. C08L 79/08
[52] U.S. Cl. .................... 524/376; 524/378; 524/600; 528/125; 528/126; 528/128; 528/179; 528/188; 528/208; 528/222; 528/229; 528/353
[58] Field of Search ..................... 524/376, 378, 600; 528/125, 126, 128, 222, 229, 179, 188, 208, 353

[56] References Cited

U.S. PATENT DOCUMENTS

| 4,065,345 | 12/1977 | Progar et al. | 524/600 |
|---|---|---|---|
| 4,115,341 | 9/1978 | Boldebuck et al. | 524/376 |
| 4,181,641 | 1/1980 | Boldebuck et al. | 524/376 |
| 4,255,471 | 3/1981 | Boldebuck et al. | 524/376 |
| 4,332,708 | 6/1982 | Boldebuck et al. | 524/376 |
| 4,382,126 | 5/1983 | Boldebuck et al. | 524/376 |

Primary Examiner—Lester L. Lee
Attorney, Agent, or Firm—Deane E. Keith; Forrest D. Stine

[57] ABSTRACT

A one-step solution technique for preparing an aromatic polyimide acid which comprises reacting an aromatic dianhydride with an aromatic diamine in the presence of propylene glycol methyl ether.

9 Claims, No Drawings

PREPARATION OF AN AROMATIC POLYIMIDE ACID BY SOLUTION POLYMERIZATION USING PROPYLENE GLYCOL METHYL ETHER

This invention relates to a method of producing a solution of a polyimide acid in one step using propylene glycol methyl ether as the solvent.

BACKGROUND OF THE INVENTION

The reaction of aromatic dianhydrides such as benzophenone tetracarboxylic dianhydride (BTDA) with aromatic diamines to produce a polyimide acid which can then be heated to produce a polyimide is well known in the art. Such polyimides are useful as adhesives, molding powders and films having excellent chemical resistance and thermal resistivity properties. U.S. Pat. No. 4,065,343 to Donald J. Proger describes a method for preparing an adhesive solution of a polyimide acid by reacting an aromatic dianhydride with an aromatic diamine in the presence of certain specified ether solvents including diglyme and other aliphatic acyclic ethers. Proger teaches in column I, lines 57 et seq., that "In certain instances, a highly viscous polyamic-acid intermediate polymer precipitates from the ether solvents. The addition of very small amounts of water or alcohol generally leads to redissolution of a polyamic-acid to give a viscous polymer solution."

We confirm the above findings when diglyme, a preferred solvent due to availability and boiling point, is used. The two-step technique of Proger suffers from the fact that it is a two-step process but more particularly because the precipitated polymer severely limits the type and size of equipment which can be employed commercially. Proger in his Example II (columns 5 and 6), which uses diglyme as the solvent, employs a household blender to perform the experiment. The normal paddle-stirred devices cannot be employed as the precipitated polymer tends to wrap itself around the paddle blades resulting in potential damage, stoppage and other problems such as an increased energy usage. All of the above problems are overcome using the method of this invention.

Proger also teaches that in some instances, a precipitate does not form, but it is not clear from Proger's teachings which solvent or combination of solvents will result in a single phase solution polyimization reaction medium. The formulation of a polymer precipitate is desirably avoided since the precipitate causes stirring problems or difficulties which eventually limit the size of the reactor and the type of stirring mechanism which can be employed.

It is therefore desirable to have a single solvent for the production of an aromatic polyimide acid which allows for a single phase solution polymerization reaction to occur to produce aromatic polyimide acids having the desired molecular weight.

BRIEF DESCRIPTION OF THE INVENTION

In accordance with the invention, a solution of an aromatic polyimide acid is prepared in a single step one-phase reaction by reacting an aromatic diamine with an aromatic dianhydride in approximately equimolar quantities in the presence of a solvent comprising propylene glycol methyl ether.

It was quite surprising to find that propylene glycol methyl ether would function as single solvent to form a solution polymerization reaction for an aromatic dianhydride and an aromatic diamine since similar materials such as methyl cellusolve would not so function.

Any aromatic dianhydride can be employed in the process of this invention, but particularly preferred are the aromatic dianhydrides having the formula:

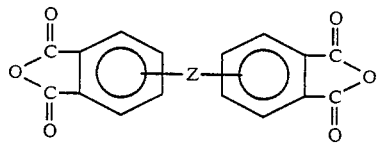

where Z is selected from the group consisting of —O— and

Examples of suitable dianhydrides include:
3,3', 4,4' benzophenone tetracarboxylic acid dianhydride
3,3',4,4'-benzophenone tetracarboxylic acid dianhydride
2,3,3',4'-benzophenone tetracarboxylic acid dianhydride
2,2',3,3'-benzophenone tetracarboxylic acid dianhydride
bis(3,4-dicarboxyphenyl)ether dianhydride
bis(2,3-dicarboxyphenyl)ether dianhydride
(2,3-dicarboxyphenyl)(3,4-dicarboxyphenyl)ether dianhydride Any aromatic diamine can be employed in the process of this invention but particularly preferred are those having the formula:

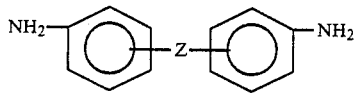

where Z is selected from the group consisting of —O— and

Examples of suitable aromatic diamines include:
3,3'-diaminobenzophenone
3,4'-diaminobenzophenone
4,4'-diaminobenzophenone
bis-(3-aminophenyl)ether
bis-(4-aminophenyl)ether
3,4'-diaminodiphenyl ether The aromatic dianhydride, exemplified by BTDA, and the aromatic diamine, exemplified by m, m'-diaminobenzophenone (DABP), react together to form an aromatic polyimide acid as illustrated in Equation I below:

Equation I:

-continued

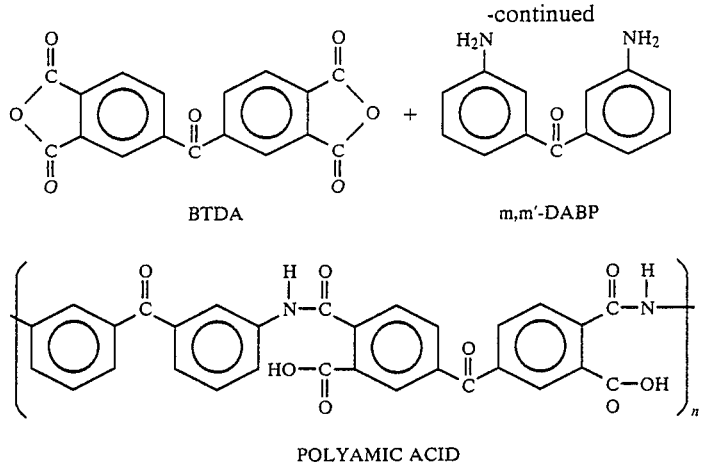

BTDA     m,m'-DABP

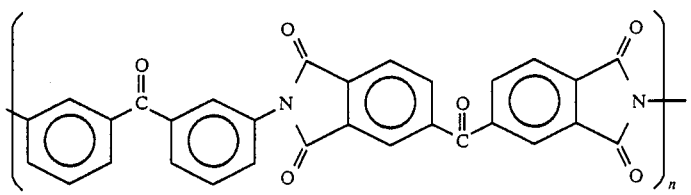

POLYAMIC ACID

On heating, the polyimide acid undergoes thermal imidization to form a thermoplastic polyimide having the recurrent unit:

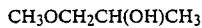

THERMOPLASTIC POLYIMIDE

The solvent to employ in the method of this invention is propylene glycol methyl ether (PGME) which has the formula:

$CH_3OCH_2CH(OH)CH_3$

The amount of PGME to employ should be sufficient for ease of mixing and to provide a heat-sink control for the temperature of reaction. Usually the amount of PGME is from 65 to 90 weight percent of the total reaction mixture, but the amount is not critical and suitable amounts can easily be developed by those having ordinary skill in the art.

The reaction is usually run by forming an initial slurry of the PGME and the aromatic diamine in a suitable reaction vessel equipped with stirring means and temperature sensing means. The aromatic dianhydride is then slowly added so as to maintain the reaction temperature below the temperature of imidization. The temperature of imidization is usually about 40° C.

The reaction conditions are quite simple and include a reaction temperature from about room temperature to about 40° C. Lower temperatures can of course be employed but offer no incentive since the reaction rate is reduced. The upper temperature as noted above is limited by the temperature at which imidization occurs and this is about 40° C. The pressure of reaction is not critical and any suitable pressure from below atmospheric to super-atmospheric pressure can be employed. Atmospheric pressure is of course preferred from the standpoint of economics. The reaction time is also not critical and is usually from about 1 to about 6 hours or more, usually from 2 to 4 hours.

PREFERRED EMBODIMENTS

The invention will be further described with reference to the following experimental work.

In all of the runs in Table I below, the aromatic dianhydride employed was 3,3', 4,4', benzophenone tetracarboxcyclic acid dianhydride (BTDA) and the aromatic diamine was meta, meta'-diaminobenzophenone (DABP). The DABP was added to a stirred reactor along with the PGME and stirred vigorously at atmospheric pressure. BTDA was then added as a fine powder at a rate such that the temperature was maintined below 40° C. to prevent imidization. The reaction time in all runs was from 2-4 hours.

TABLE I

| Example No. | Solvent | Grams | DABP g (moles) | BTDA g (moles) | WT % Solids | Inh. vis.[a] at 25° C. | Comments |
|---|---|---|---|---|---|---|---|
| 1 | $CH_3OCH_2CH(OH)CH_3$, | 93.0 | 7.80 (.0371) | 11.95 (.0371) | 17.4 | .707 | |
| 2 | $CH_3OCH_2CH(OH)CH_3$, | 75.0 | 12.74 (.0600) | 19.36 (.0601) | 30.0 | .713 | |
| 3 | $CH_3OCH_2CH(OH)CH_3$, | 1896 | 152.5 (.718) | 231.1 (.718) | 16.8 | .669 | |
| 4 | $CH_3OCH_2CH_2OH$ | 93 | 7.80 (.0368) | 11.85 (.0368) | 17.4 | .240 | |
| 5 | $CH_3OCH_2CH_2OCH_3$ (monoglyme) | 93 + 2 grams MeOH[b] | 7.80 (.0368) | 11.85 (.0368) | — | — | Formed a 2-phase system; could not bring into solution even with added MeOH. |
| 6 | $CH_3OCH_2CH_2OCH_3$, | 79.0 | 7.80 | 11.85 | 16.8 | 0.450 | Two phases added |

TABLE I-continued

| Example No. | Solvent | Grams | DABP g (moles) | BTDA g (moles) | WT % Solids | Inh. vis.[a] at 25° C. | Comments |
|---|---|---|---|---|---|---|---|
| | CH₃OCH₂CH₂OH, | 16.9 | | | | | 1.6 g MeOH to obtain one phase. |
| 7 | CH₃OCH₂CH₂OCH₃, CH₃OCH₂CH₂OH | 74.4 24.8 | 7.8 | 11.85 | 16.5 | .390 | Required this amount of methyl cellusolve to obtain one phase. |
| 8 | CH₃CH₂OCH₂CH₂OCH₂CH₃, (Ethylglyme) | 93 grams | 7.8 DABP | 11.85 | | | Precipitated after 40% of BTDA added & could not be re-dissolved by adding 2 g MeOH at room temperature to 40° C. |

[a]Determined on a 0.5% solution in dimethyl acetamide by ASTM Test D2857 as deciliters per gram.
[b]MeOH was added initially.

Referring to Table I, Examples 1 through 3 illustrate the process of this invention and in these Examples the initial slurry forms a clear dark amber solution after about 25 percent of the BTDA was added. No phase separation was observed during the remainder of the runs for Examples 1-3. The inherent viscosity of the products in all cases was about 0.7.

In the run for Example 4, methyl cellusolve (CH₃OCH₂CH₂OH) was used as the solvent in place of the PGME. A polymer mass separated as the reaction proceeded and the inherent viscosity of the product was only 0.240.

In the run for Example 5, monoglyme (CH₃OCH₂CH₂OCH₃) containing 2 grams of methanol was used as the solvent in lieu of the PGME of Examples 1-3. Again, a two-phase system was observed which could not be brought into a one-phase system. The inherent viscosity of the product was not taken.

In the run for Example 6, a mixture of monoglyme and methyl cellusolve was used as a solvent and again a two-phase mixture was formed and the inherent viscosity of the product was 0.450. It was found that the addition of 1.6 grams of methanol permitted a single-phase solution polymerization reaction to occur.

In Example 7, Example 6 was repeated except an additional amount of methyl cellusolve was employed and a one-phase solution polymerization reaction was achieved. However, the product had an inherent viscosity of only 0.390 which is below the range of molecular weight required to have the product function successfully as an adhesive.

In Example 8, ethylglyme (CH₃CH₂OCH₂CH₂OCH₂CH₃) was employed as the sole solvent and precipitation of a polymer occurred after 40 percent of the BTDA was added and this polymer mass could not be re-dissolved by the addition of 2 grams of methanol at room temperature to 40° C. The inherent viscosity of the product was not taken.

Obviously, many modifications and variations of the invention, as hereinabove set forth, can be made without departing from the spirit and scope thereof, and therefore only such limitations should be imposed as are indicated in the appended claims.

We claim:

1. A method for preparing a solution of an aromatic polyimide acid which comprises:

reacting an aromatic dianhydride with an approximately equimolar quantity of an aromatic diamine in the presence of a solvent comprising propylene glycol methyl ether.

2. A method according to claim 1 wherein the dianhydride has the formula:

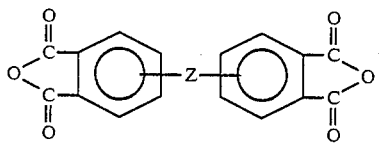

where Z is selected from the group consisting of —O— and

3. A method according to claim 2 wherein the dianhydride is 3,3', 4,4', benzophenone tetracarboxcyclic acid dianhydride.

4. A method according to claim 1 wherein the aromatic diamine has the formula:

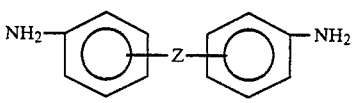

where Z is selected from the group consisting of —O— and

5. A method according to claim 4 wherein the aromatic diamine is meta, meta'-diaminobenzophenone.

6. A method according to claim 1 wherein the aromatic dianhydride is added to a slurry of the aromatic diamine and the solvent at a rate such that the temperature of reaction is maintained at a temperature below the temperature where imidization would occur.

7. A method according to claim 6 wherein the reaction temperature is maintained at less than about 40° C.

8. A method in accordance with claim 1 wherein the weight percent of the propylene glycol methyl ether is from 65 to 90 weight percent of the reaction mixture.

9. A method in accordance with claim 1 wherein the molar ratio of said dianhydride to said diamine is from about 0.95:1 to about 1.05:1.

* * * * *